(12) United States Patent
Dimova et al.

(10) Patent No.: US 10,119,411 B2
(45) Date of Patent: Nov. 6, 2018

(54) EXHAUST-GAS TURBOCHARGER

(71) Applicant: BorgWarner Inc., Auburn Hills, MI (US)

(72) Inventors: Aleksandra Dimova, Kirchheimbolanden (DE); Thomas Lischer, Neustadt (DE)

(73) Assignee: BorgWarner Inc., Auburn Hills, MI (US)

( * ) Notice: Subject to any disclaimer, the term of this patent is extended or adjusted under 35 U.S.C. 154(b) by 982 days.

(21) Appl. No.: 14/406,644

(22) PCT Filed: Jun. 20, 2013

(86) PCT No.: PCT/US2013/046726
§ 371 (c)(1),
(2) Date: Dec. 9, 2014

(87) PCT Pub. No.: WO2014/004238
PCT Pub. Date: Jan. 3, 2014

(65) Prior Publication Data
US 2015/0176422 A1    Jun. 25, 2015

(30) Foreign Application Priority Data

Jun. 25, 2012 (DE) .................. 10 2012 012 558

(51) Int. Cl.
*F01D 11/02* (2006.01)
*F04D 17/10* (2006.01)
(Continued)

(52) U.S. Cl.
CPC ............... *F01D 11/02* (2013.01); *F02C 6/12* (2013.01); *F04D 17/10* (2013.01); *F04D 25/024* (2013.01);
(Continued)

(58) Field of Classification Search
CPC . F01D 11/02; F02C 6/12; F04D 17/10; F04D 25/024; F04D 29/102; F04D 29/162
See application file for complete search history.

(56) References Cited

U.S. PATENT DOCUMENTS 1,661,107 A * 2/1928 Cleveland ................ F03B 3/00
                                                    415/143
3,575,523 A * 4/1971 Gross, Jr. .................. F01D 5/20
                                                    415/171.1
(Continued)

FOREIGN PATENT DOCUMENTS

JP    2003343486 A    12/2003
JP    2010242520 A    10/2010

OTHER PUBLICATIONS

International Search Report and Written Opinion in International Application No. PCT/US2013/046726 dated Oct. 22, 2013.

*Primary Examiner* — Igor Kershteyn
(74) *Attorney, Agent, or Firm* — Eric L. Doyle; Stephan A. Pendorf; Patent Central LLC

(57) ABSTRACT

An exhaust-gas turbocharger (1) comprising a housing (2), a turbine wheel (5) with blades (6), a compressor wheel (4) with blades (6), and a shaft (3) which is mounted in the housing (2) and which connects the turbine wheel (5) and compressor wheel (4), wherein, in a gap (7) between the housing (2) and at least one blade (6), a contactless labyrinth seal (8) is formed on the blade (6) and on the housing (2), wherein the labyrinth seal (8) comprises at least one combination of a groove (13) and a projection (14).

10 Claims, 5 Drawing Sheets

(51) Int. Cl.
*F04D 29/10* (2006.01)
*F02C 6/12* (2006.01)
*F04D 25/02* (2006.01)
*F04D 29/16* (2006.01)

(52) U.S. Cl.
CPC ......... *F04D 29/102* (2013.01); *F04D 29/162* (2013.01); *F05D 2220/40* (2013.01)

(56) References Cited

U.S. PATENT DOCUMENTS

| | | | | |
|---|---|---|---|---|
| 3,867,060 A | * | 2/1975 | Huber | F01D 11/08 277/419 |
| 3,893,787 A | * | 7/1975 | Jones | F04D 29/685 415/173.5 |
| 4,594,052 A | * | 6/1986 | Niskanen | F04D 7/045 415/121.1 |
| 5,154,587 A | * | 10/1992 | Mori | F04D 29/0413 384/320 |
| 5,304,033 A | * | 4/1994 | Tang | F04D 29/4213 415/206 |
| 5,375,974 A | | 12/1994 | Heinrich | |
| 5,632,598 A | * | 5/1997 | Maier | F01D 5/225 415/173.5 |
| 7,008,191 B2 | * | 3/2006 | Billington | F04D 29/266 416/204 A |
| 7,255,531 B2 | * | 8/2007 | Ingistov | F01D 5/225 415/173.1 |
| 2010/0098532 A1 | | 4/2010 | Diemer et al. | |
| 2011/0091323 A1 | | 4/2011 | Koike et al. | |

* cited by examiner

EXHAUST-GAS TURBOCHARGER

BACKGROUND OF THE INVENTION

Field of the Invention

The invention relates to an exhaust-gas turbocharger with reduced flow loss through the gap between the blade and housing.

Description of the Related Art

Turbochargers which are already known generally have a housing in which a shaft is mounted The shaft connects a turbine wheel and a compressor wheel. The turbine wheel and the compressor wheel have in each case multiple blades. Between the blade tips and the housing there is formed a small gap such that the blades can move without making contact with the housing. Each blade has a suction side and a pressure side. A loss flow from the pressure side to the suction side of the blade is generated by the gap between the blade and the housing.

It is an object of the present invention to specify an exhaust-gas turbocharger which, while being inexpensive to produce and assemble, can be operated with the greatest possible efficiency.

This object is achieved by the features of claim 1. The dependent claims relate to preferred refinements of the invention.

BRIEF SUMMARY OF THE INVENTION

It has been recognized according to the invention that the flow through the gap between blades and housing can be improved by means of a contactless labyrinth seal in the region of the blade tips. The labyrinth seal according to the invention comprises at least one combination of a groove and a projection which projects into the groove. Either the groove or the projection is formed on the blade. The other element in each case is formed on the inner side of the housing.

It is preferably also possible for multiple combinations of a projection and a groove to be used. It is thus the case, for example, that multiple projections are formed on each blade, and accordingly also multiple grooves are formed in the housing. Furthermore, it is also possible for both projections and also grooves to be formed on the blades, and for grooves and projections to be formed correspondingly on the housing.

In a particularly preferred embodiment, the labyrinth seal is used on the blades of the compressor wheel. The greatest pressures at the compressor wheel arise in the region of the compressor outlet. Therefore, the labyrinth seal is preferably implemented in the region of the compressor outlet.

Both the groove and also the projection may have any desired geometry. It is preferably provided that the projection is trapezoidal. As a result of the trapezoidal design, the contour of the blade tip merges into the projection not with edges of 90° but rather with a smaller angle.

The labyrinth seal according to the invention impedes the loss flow via the gap between the blade and housing, and in so doing simultaneously reduces the undesired backflow from the compressor outlet.

BRIEF DESCRIPTION OF THE SEVERAL VIEWS OF THE DRAWINGS

Further details, advantages and features of the invention become apparent from the following description of an exemplary embodiment with reference to the drawing, in which.

DETAILED DESCRIPTION OF THE INVENTION

An exemplary embodiment will be explained below on the basis of FIGS. 1 to 5.

Figure 1:
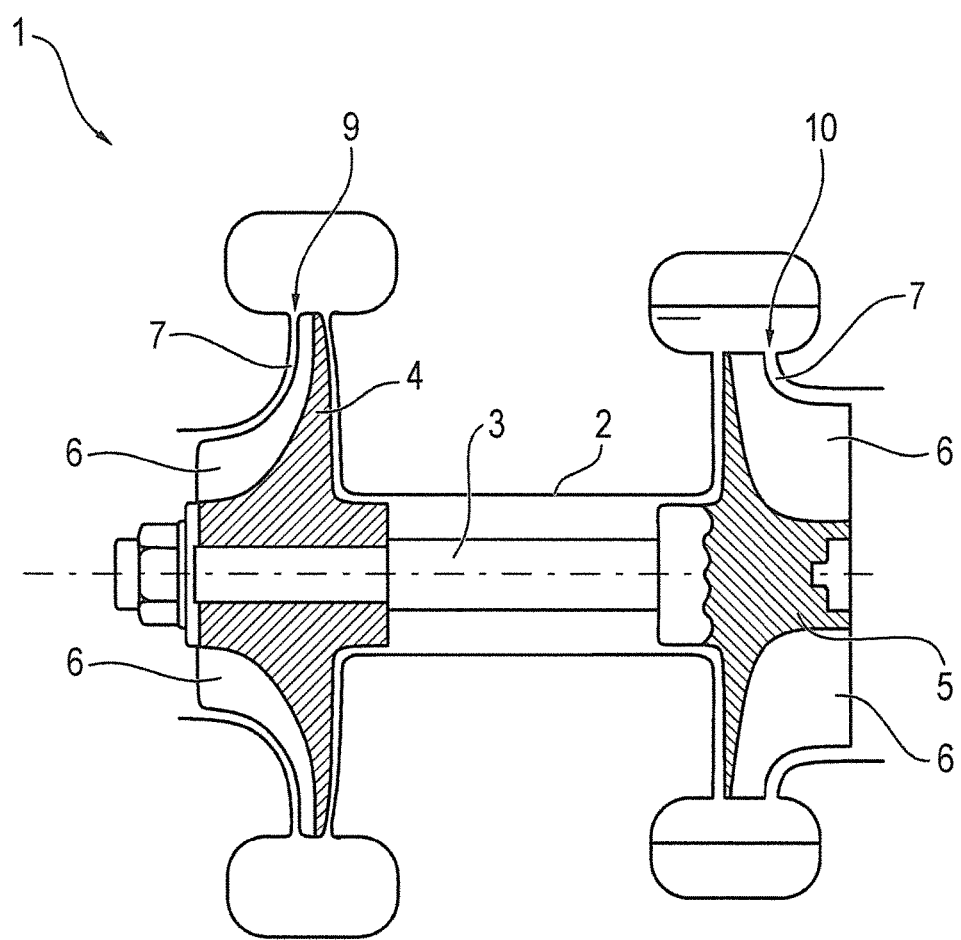
FIG. 1 shows a schematically simplified sectional view of an exhaust-gas turbocharger according to the invention as per an exemplary embodiment.

FIG. 1 is a highly simplified illustration of an exhaust-gas turbocharger 1. The exhaust-gas turbocharger 1 comprises a housing 2 in which a shaft 3 is rotatably mounted. A compressor wheel 4 and a turbine wheel 5 are seated in a rotationally conjoint manner on the shaft 3. Both the turbine wheel 5 and also the compressor wheel 4 have in each case multiple blades 6.

The compressor wheel 4 compresses inducted charge air in the direction of a compressor outlet 9. At a turbine inlet 10, exhaust gas flows to the turbine wheel 5 and thus drives the turbine wheel 5, the shaft 3 and the compressor wheel 4.

A gap 7 is formed between the blades 6 and the housing 2.

Figure 2:
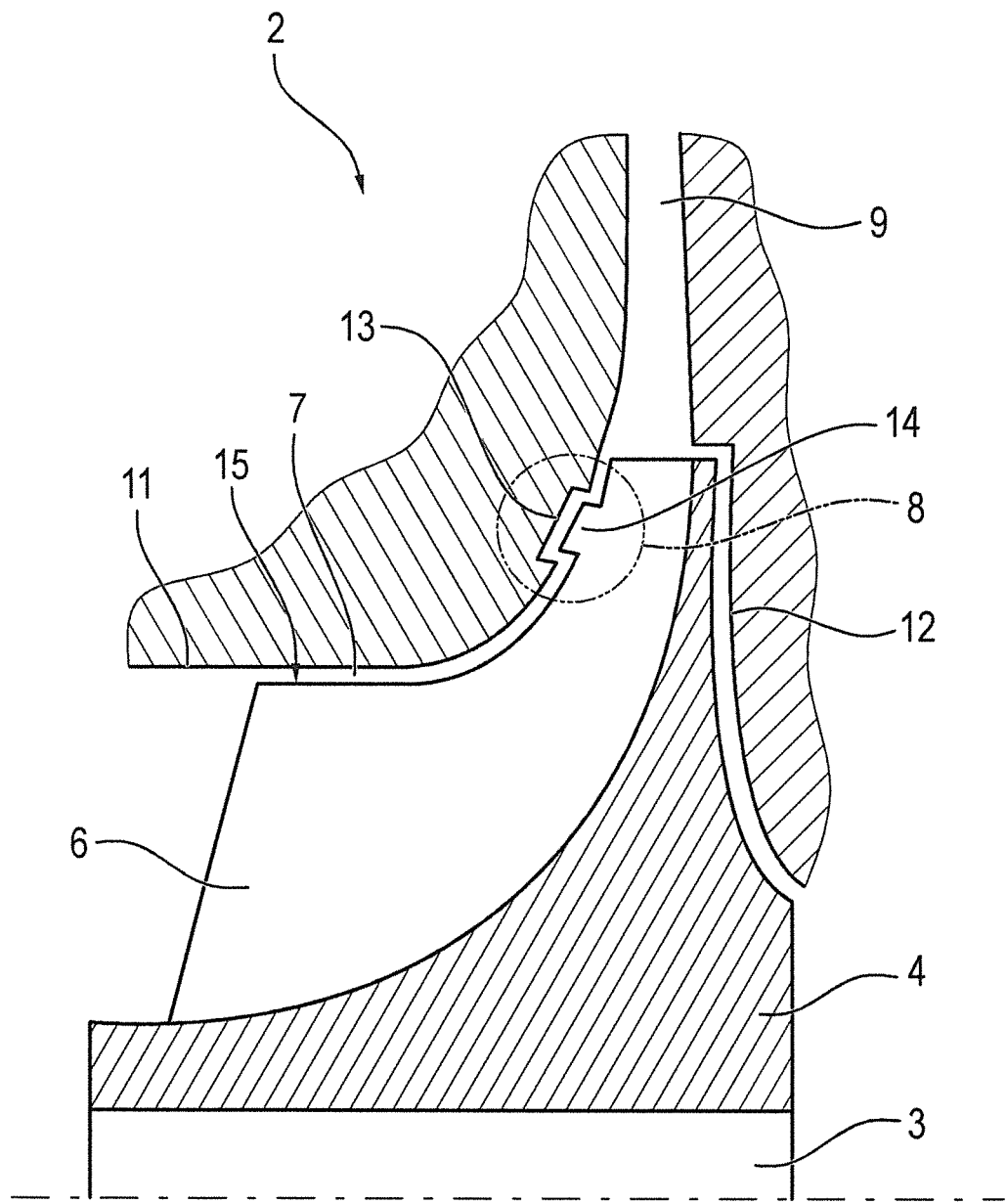
FIG. 2 shows a detail of the exhaust-gas turbocharger according to the invention as per a first exemplary embodiment.

FIG. 2 shows a detail of the compressor wheel 4 and of the housing 2. According to FIG. 2, the housing 2 may be of multi-part construction. It can be seen that the housing 2 is assembled from a compressor housing 11 and a bearing housing 12.

According to a first embodiment of the invention, to prevent flow loss in the gap 7, the labyrinth seal 8 shown in FIG. 2 is used. The labyrinth seal 8 is composed of a combination of a groove 13 in the compressor housing 2 and a projection 14 on each blade 6. In the example shown, the groove 13 is formed over the full circumference and in a continuous fashion on the inner side of the housing 2, in particular of the compressor housing 11.

Figure 4:
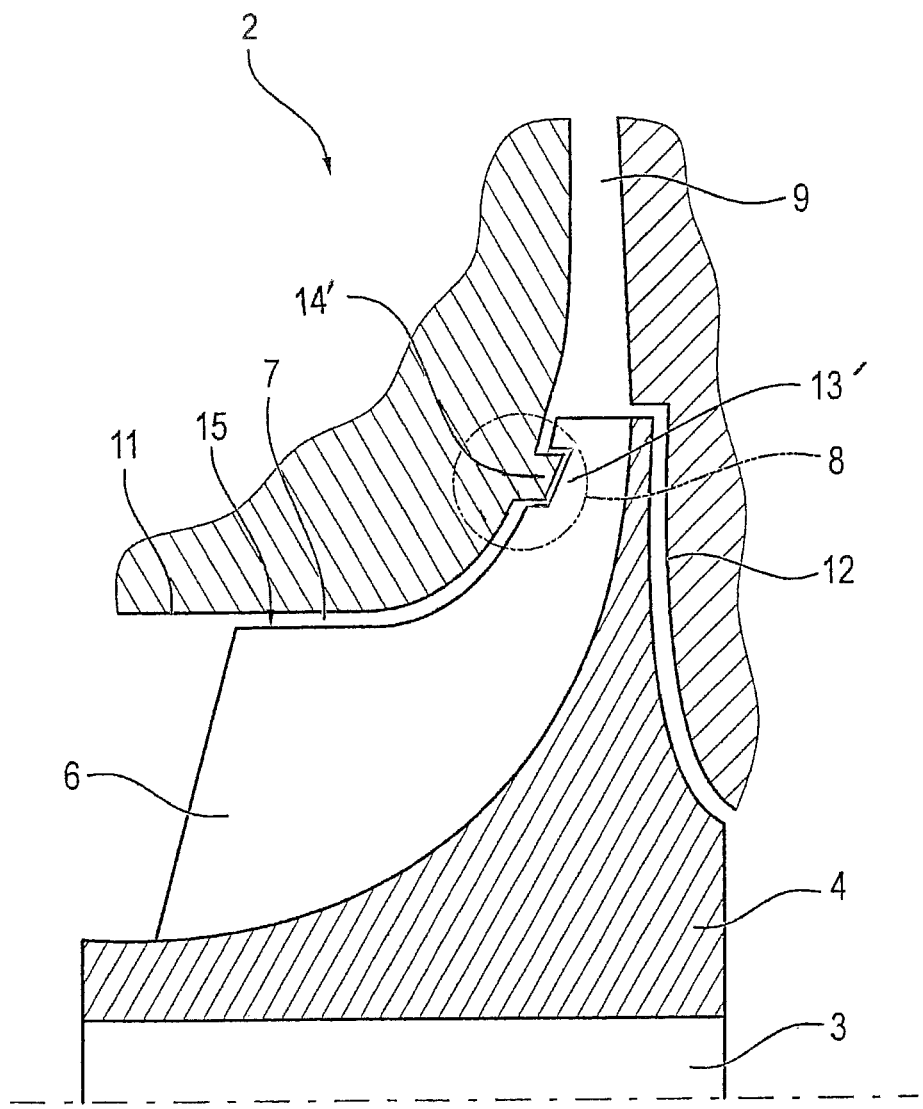
FIG. 4 shows a detail of the exhaust-gas turbocharger according to a second embodiment the invention.

According to a second embodiment of the invention, the labyrinth seal 8 shown in FIG. 4 is used. The labyrinth seal 8 is composed of a combination of a grooves 13' on each blade 6 and a projection 14' in the compressor housing 2. In the example shown, the projection 14' is formed over the full circumference and in a continuous fashion on the inner side of the housing 2, in particular of the compressor housing 11.

Figure 3:
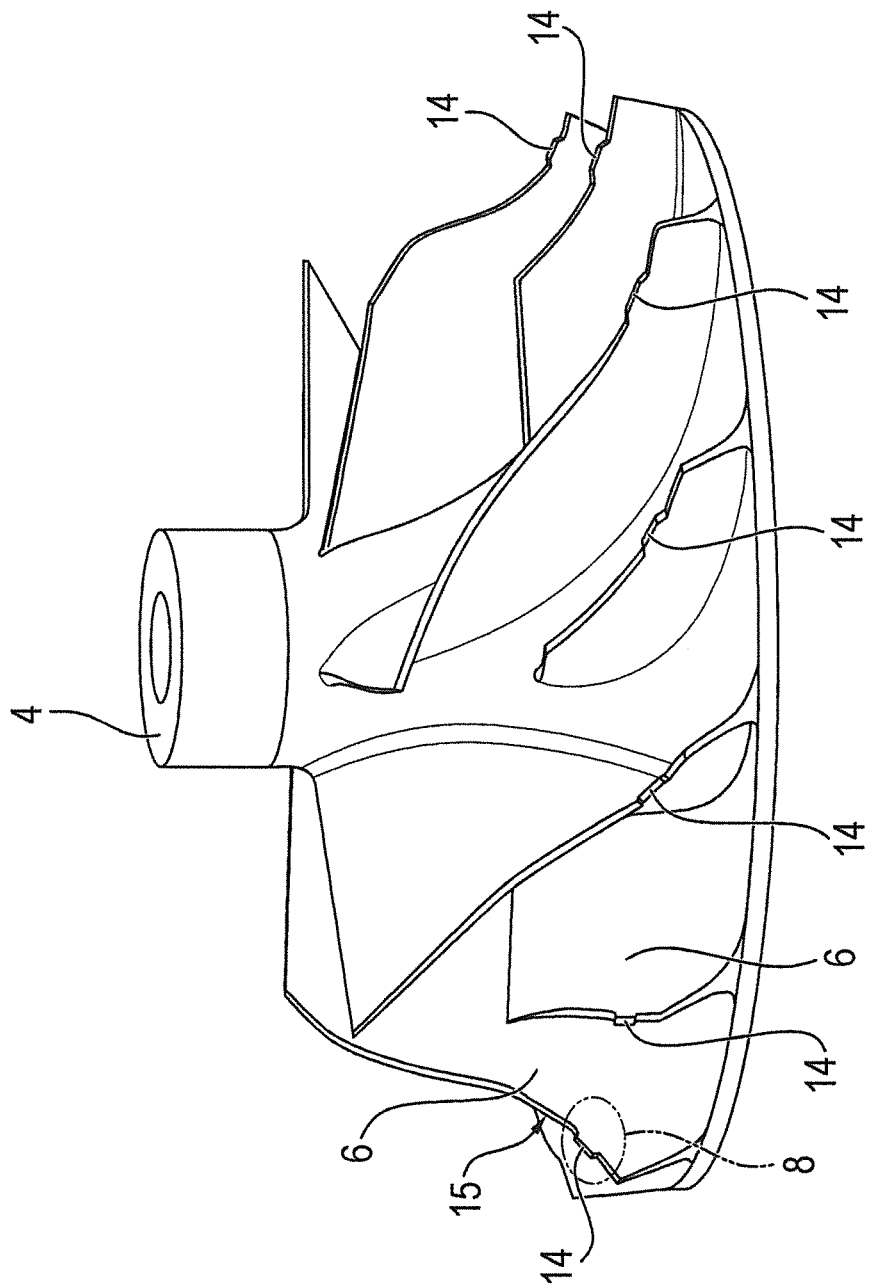
FIG. 3 shows a compressor wheel of the exhaust-gas turbocharger according to the invention as per the first exemplary embodiment.
Figure 5:
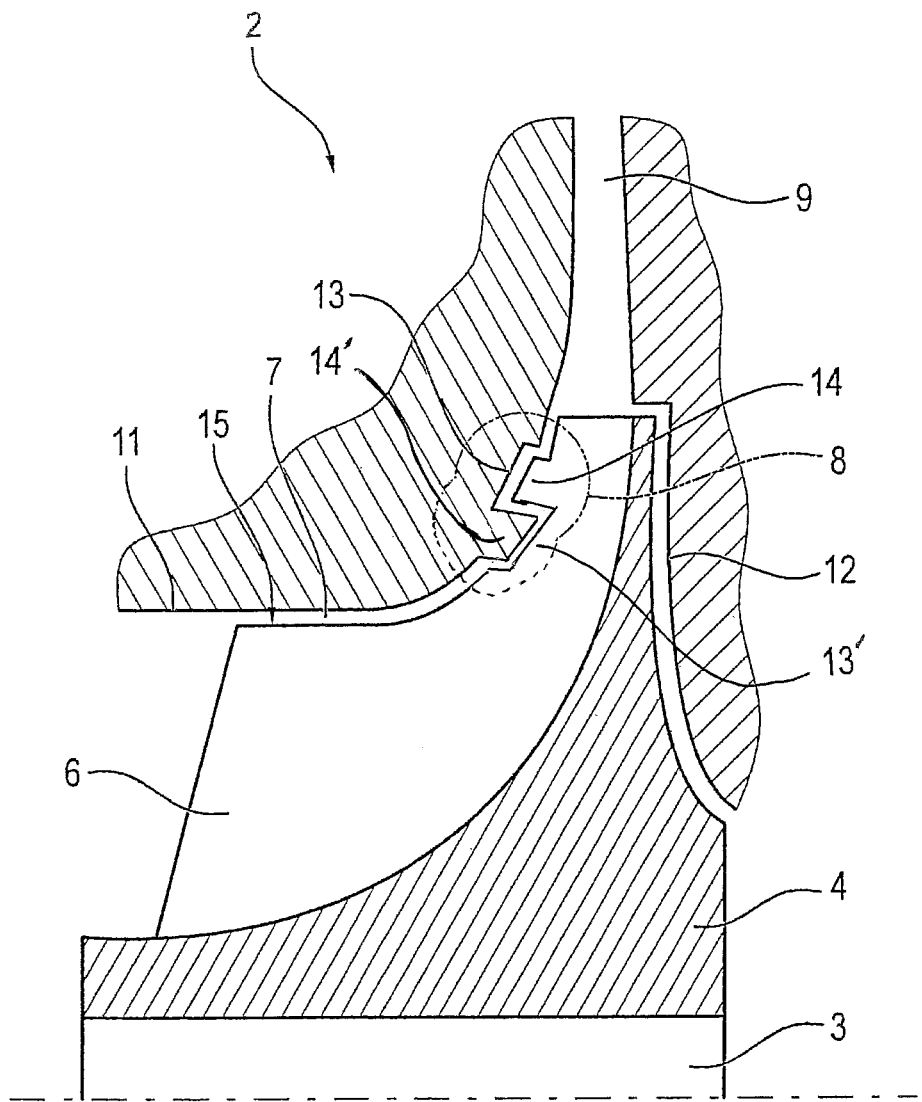
FIG. 5 shows a detail of the exhaust-gas turbocharger according to a third embodiment the invention.

As an alternative to the first and second embodiments shown in FIGS. 2-4, the labyrinth seal 8 may also have multiple projections 14, 14' and/or in a third embodiment shown in FIG. 5, may have combinations of projections 14 and grooves 13' along a blade tip 15 of a blade 6. Corresponding, complementary grooves 13 and projections 14' are then formed in the housing, such that in each case one projection 14, 14' project into a groove 13', 13.

It is also possible for the labyrinth seal shown to be implemented on the blades 16 of the turbine wheel 5.

In addition to the above written description of the invention, reference is hereby explicitly made to the diagrammatic illustration of the invention in FIGS. 1 to 3 for additional disclosure thereof.

LIST OF REFERENCE SIGNS

1 Exhaust-gas turbocharger
2 Housing
3 Shaft
4 Compressor wheel
5 Turbine wheel
6 Blades
7 Gap
8 Labyrinth seal
9 Compressor outlet
10 Turbine inlet
11 Compressor housing
12 Bearing housing
13 Groove
14 Projection
15 Blade tip

The invention claimed is:

1. An exhaust-gas turbocharger (1) comprising:
a housing (2),
a turbine wheel (5) with blades (6) adapted for receiving air radially and discharging air axially,
a compressor wheel (4) with blades (6) adapted to drawing air in axially and discharging air radially, and
a shaft (3) which is mounted in the housing (2) and which connects the turbine wheel (5) and compressor wheel (4),
wherein,
in a gap (7) between the housing (2) and at least one blade (6), a contactless labyrinth seal (8) is formed on the blade (6) and on the housing (2), wherein the labyrinth seal (8) comprises at least one combination of a groove (13) and a projection (14).

2. The exhaust-gas turbocharger as claimed in claim 1, wherein the labyrinth seal (8) comprises at least one groove (13) in the housing (2) and one projection (14), which projects into the groove (13), on the blade (6), and/or at least one groove (13) in the blade (6) and one projection (14), which projects into the groove (13), on the housing (2).

3. The exhaust-gas turbocharger as claimed in claim 1, wherein the labyrinth seal (8) comprises multiple combinations of a groove (13) and a projection (14) on a blade (6).

4. The exhaust-gas turbocharger as claimed in claim 1, wherein the groove (13) and/or the projection (14) is arranged at a blade tip (15) of the blade (6).

5. The exhaust-gas turbocharger as claimed in claim 1, wherein the groove (13) and/or the projection (14) is arranged on each blade (6) of the compressor wheel (4) or turbine wheel (5).

6. The exhaust-gas turbocharger as claimed in claim 1, wherein the groove (13) and/or the projection (14) is arranged in that half of the blade (6) of the compressor wheel (4) which faces toward a compressor outlet (9).

7. The exhaust-gas turbocharger as claimed in claim 1, wherein the groove (13) and/or the projection (14) is arranged in that half of the blade (6) of the turbine wheel (5) which faces toward a turbine inlet (10).

8. The exhaust-gas turbocharger as claimed in claim 1, wherein the groove (13) and/or the projection (14) is trapezoidal.

9. The exhaust-gas turbocharger as claimed in claim 1, wherein the groove (13) and/or the projection (14) is arranged in the downstream half of the blade (6) of the compressor wheel (4).

10. The exhaust-gas turbocharger as claimed in claim 1, wherein the groove (13) and/or the projection (14) is arranged in the upstream half of the blade (6) of the turbine wheel (5).

* * * * *